(12) United States Patent
Miyatake et al.

(10) Patent No.: US 6,466,262 B1
(45) Date of Patent: Oct. 15, 2002

(54) DIGITAL WIDE CAMERA (75) Inventors: Takafumi Miyatake, Hachioji; Akio Nagasaka, Kokubunji; Masakazu Ejiri, Tokorozawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/093,782

(22) Filed: Jun. 9, 1998

(30) Foreign Application Priority Data

Jun. 11, 1997 (JP) .............................................. 9-153303

(51) Int. Cl.$^7$ ............................. H04N 7/00; H04N 5/14; G06K 9/46; G06K 9/52; G06K 9/36
(52) U.S. Cl. ........................... 348/218; 348/36; 348/39; 348/699; 382/206; 382/284; 382/194
(58) Field of Search ......................... 348/36, 218, 699; 382/206, 284, 194

(56) References Cited

U.S. PATENT DOCUMENTS

| | | | |
|---|---|---|---|
| 4,890,314 A | * 12/1989 | Judd et al. | 348/14.01 |
| 5,548,409 A | * 8/1996 | Ohta et al. | 348/36 |
| 5,602,584 A | * 2/1997 | Mitstake et al. | 348/218 |
| 5,646,679 A | * 7/1997 | Yano et al. | 348/218 |
| 5,682,197 A | * 10/1997 | Moghadam et al. | 348/36 |
| 5,760,826 A | * 6/1998 | Nayar | 348/36 |
| 5,798,791 A | * 8/1998 | Katayama et al. | 348/218 |
| 5,880,778 A | * 3/1999 | Akagi | 348/218 |
| 5,889,553 A | * 3/1999 | Kino et al. | 348/218 |
| 5,903,303 A | * 5/1999 | Fukushima et al. | 348/47 |
| 5,963,255 A | * 10/1999 | Anderson et al. | 348/372 |
| 5,963,664 A | * 10/1999 | Kumar et al. | 382/284 |
| 5,973,726 A | * 10/1999 | Iijima et al. | 348/36 |
| 6,005,987 A | * 12/1999 | Nakamura et al. | 382/294 |
| 6,072,833 A | * 6/2000 | Yamauchi | 348/699 |
| 6,122,319 A | * 9/2000 | Lee et al. | 348/699 |
| 6,191,808 B1 | * 2/2001 | Katayama et al. | 348/39 |

FOREIGN PATENT DOCUMENTS

| | | | |
|---|---|---|---|
| EP | 0599470 A1 | * 1/1994 | ............ H04N/7/18 |
| JP | 6-121226 | 4/1994 | |
| JP | 06-326965 | 11/1994 | |

* cited by examiner

*Primary Examiner*—Wendy R. Garber
*Assistant Examiner*—John Villecco
(74) *Attorney, Agent, or Firm*—Mattingly, Stanger & Malur, P.C.

(57) ABSTRACT

A digital wide camera is capable of forming, in real time, a wide view still image from a dynamic sequence of images generated during a recording operation by panning the camera to capture a scene. The camera shoots each frame of the sequence with a certain angular field of view at 30 frames per second, for example. The wide view still image has an apparent field of angular view that is greater than that of the image of each frame. The images of the sequence are connected together by determining a shift in position between adjacent images and then overwriting each image to a wide view image buffer after shifting the image by the shift amount. Determining the shift amounts and overwriting the image buffer is accomplished in less time than the interval between shooting consecutive images so that the display of the wide view image can be updated in real time for a user's observation. The amount of shift in position is determined using global pattern matching between adjacent images by taking the projections of the intensity values of the pixels in the horizontal and vertical directions of the images being compared. The projections are subjected to collation processing to identify the amounts in shift in each direction.

14 Claims, 10 Drawing Sheets

DIGITAL WIDE CAMERA

FIELD OF THE INVENTION

The present invention relates to a digital camera and, particularly, to a digital camera capable of obtaining a wide view still image from a series or sequence of images shot by operating a digital camera by panning or a combination of panning and other camera movements.

BACKGROUND OF THE INVENTION

In recent years, a variety of kinds of digital cameras have been placed on the market as tools for collecting information. Technically, various cameras have been made that address the importance of portability and functions related to the quality of the picture obtained by using the camera. The images shot are digital, and hence can be readily input to a computer, transmitted, placed on a home page of the Internet, and printed. Therefore, use of digital cameras is rapidly spreading.

At present, however, the picture quality of digital cameras is quite inferior to that of traditional silver salt, photographic film cameras. The average resolution of the current digital cameras is 320 pixels×240 pixels, which makes it difficult to grasp the content of the image when a large angular field of view is used. This leads to limitations in various fields of use of such cameras.

In the field of business presentations, when a whiteboard of an average size is used for a meeting or the like and is shot by using a digital camera, it is at times difficult to read the written contents on the whiteboard, when it is attempted to capture the entire whiteboard in a single image due to insufficient resolution. When a slender advertisement board or a wide building is to be shot with a digital camera with the expectation of capturing details in the resultant picture, furthermore, many pictures must be taken from different points of view in order to obtain satisfactory resolution.

Similarly, whenever a user wants to shoot a picture of a scene to obtain a high-definition, wide view image, as when a commemorative picture is taken of many people together, a plurality of pictures must be shot in a divided manner to capture the entire scene. The same holds true for a user who wants to take a panoramic picture of mountains, for example. What the user really wants to see in the final image is detail in the picture. In practice, however, the user must obtain a plurality of views of the scene from several images, and synthesize a single wide view image in his mind from these views.

In the field of computer graphics, one product addressing this issue is QuickTime VR of Apple Co., which provides a single panoramic still image covering a surrounding scene of 360 degrees. To obtain a panoramic still image using this product, it is necessary to form a dynamic image starting at an arbitrary visual point and then take many shots to cover the whole surrounding scene. Then, a user must carefully paste the images together by using an image editing tool. Accordingly, editing of the shots is required to obtain the panoramic image.

In comparison to the present invention, there has been proposed an "Image Sensing Device, Image Processing Device and Image Reproducing Device", disclosed in Japanese Patent Laid-Open No. 121226/1994 (hereinafter referred to the prior art method). In order to obtain a wide view still image from a series of images, by using the prior art method, an operation is executed to detect, with respect to a preceding image, a novel image portion in a succeeding image for a plurality of succeeding images. Then, the preceding image and the novel image portions obtained from the succeeding images are joined together to form a wide image. The joining together of the images is performed automatically, but not in real time.

That is, in the prior art method, the moving vectors of the image are obtained and are referred to in order to set an image portion that is to be joined. However, since the moving vectors of the image are obtained in the prior art method, a wide view still image cannot be obtained in real time. Specifically, the prior art method uses pattern matching that is accomplished using two-dimensional template matching by dividing each frame (the preceding and succeeding images) into a plurality of blocks. In order to achieve real time processing for this type of pattern matching, it is necessary to have a special LSI for each of the blocks. Accordingly, this requires a large number of LSIs for real time processing. This is expensive and impractical. That is, the image sensing device becomes expensive and large when it is intended to obtain a wide view image in real time. To realize a small and cheap image sensing device that provides wide view images, on the other hand, it becomes necessary to operate a plurality of templates for matching using a small number of LSIs, which has been difficult in the prior art, so real-time processing in digital cameras has not been practical.

SUMMARY OF THE INVENTION

As described above, conventional digital cameras are convenient to use from the standpoint of the functions provided, but are inferior to silver salt based photographic film cameras from the standpoint of picture quality. Therefore, in order for users to obtain a wide view image many pictures of a scene must be taken in a divided manner and, in some cases, the user must paste the images together using an image editing tool on a computer.

A first object of the present invention is to provide a digital wide camera of a small size capable of forming, in real time, a wide view still image similar to the image of a wide angle view, from the viewpoint of the user, with a high resolution.

A second object of the present invention is to provide a digital wide camera capable of forming a wide view still image by operating and controlling the images to synthesize an image at high speeds, including in real time.

A third object of the present invention is to provide a digital wide camera which makes it possible to confirm the progress of forming the wide view still image while the picture is being taken.

Although the expressions wide view and digital wide camera are used in discussing the present invention, the meaning relates to not only a wide angle view, as obtained for example, from wide angle lenses in the prior art, which is equally possible to obtain with the digital wide camera of the present invention, but also to an image obtained by using the camera that represents a view, from the viewpoint of the user, that is wider than that normally obtained by a single image. Further, the wide view image is considered to be not only wider, but also wider and/or taller in view than that of a normal view, wherein the extent of the view that is captured by the camera relates to the coverage of the scene by the user that is obtained by panning the camera or otherwise moving the camera in any direction while the scene is being shot.

DETAILED DESCRIPTION OF THE PREFERRED EMBODIMENTS

Figure 1:
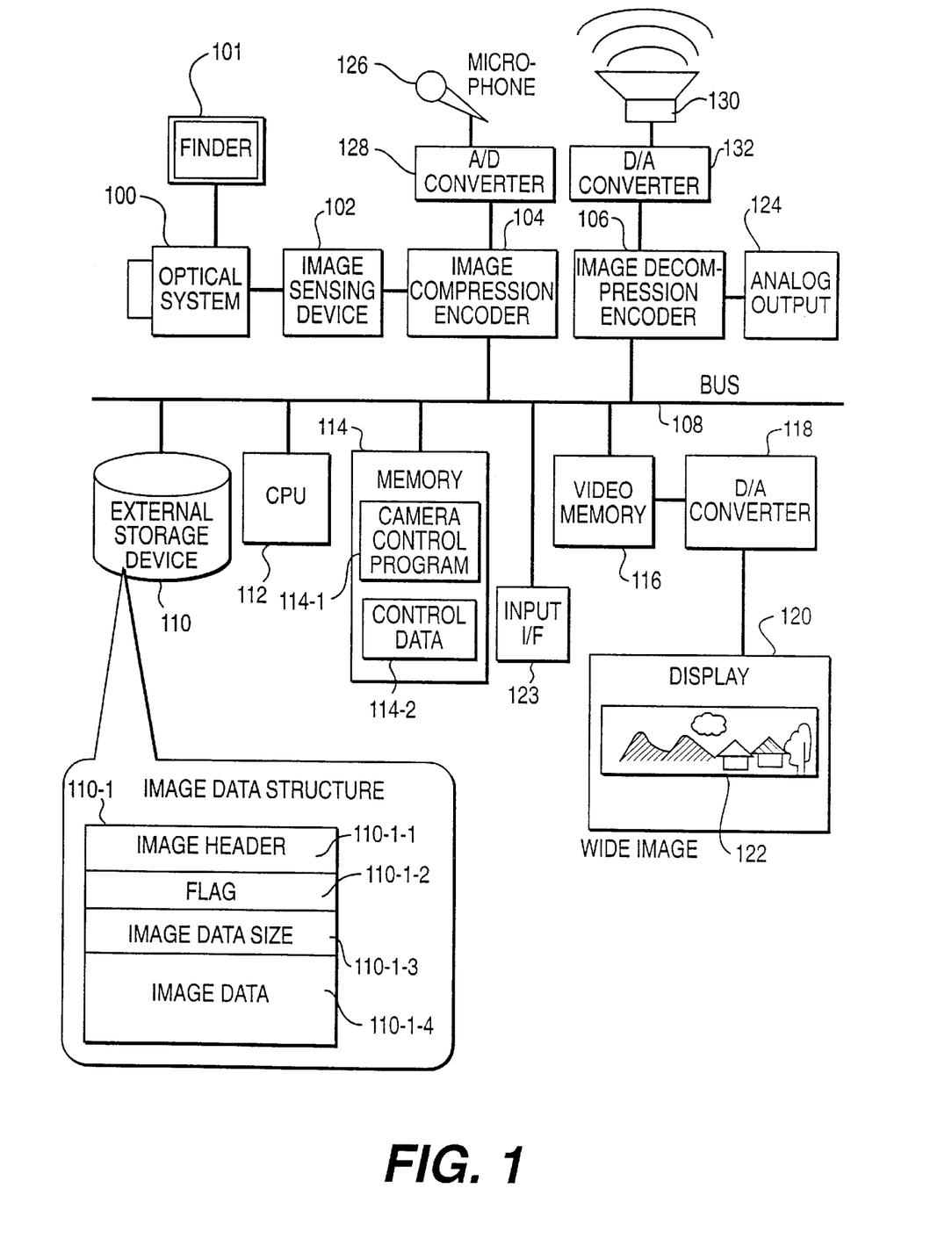
FIG. 1 is a block diagram of a system for realizing the present invention.

FIG. 1 is a block diagram of a digital wide camera according to a preferred embodiment of the present invention. The digital camera is functionally divided into two parts and may be formed in a single camera body or housing, or may be divided so that the optical, audio and image sensing parts of the camera and an image display, as well as the image compression and decompression coding circuits, are separate from the image processing part of the camera which connects the sequence of pictures together and stores the wide view images as well as optionally displays the images.

Figure 2:
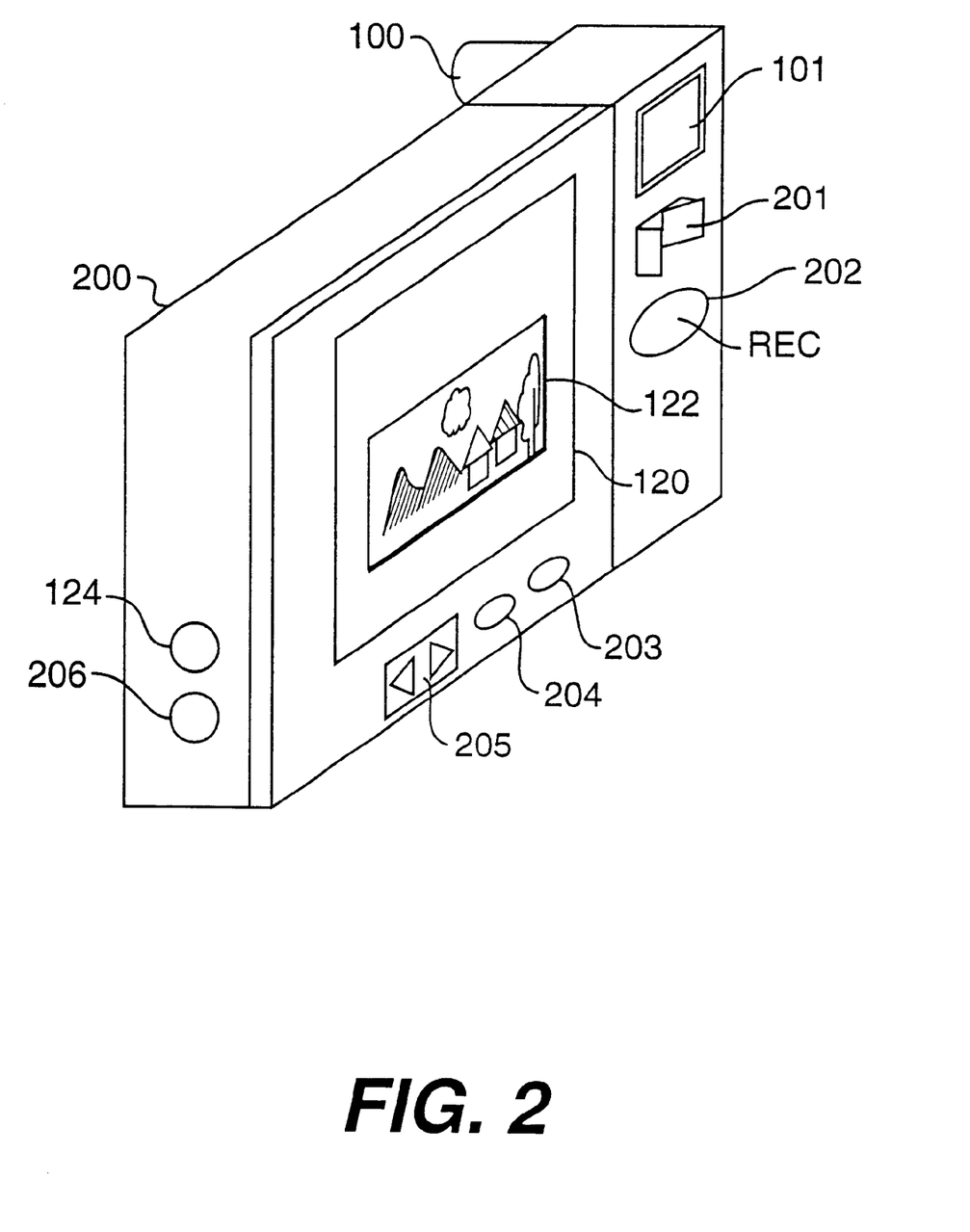
FIG. 2 is a schematic perspective view of a digital wide camera according to the present invention.

As shown in FIG. 1, a bus 108 schematically depicts a connection between the components of the camera. Above the bus 108 are shown components that are generally equivalent to the components found in a conventional MPEG camera, such as an MPEG-10 digital disk camera of Hitachi, Ltd. Below the bus 108 are shown the components typically found in a digital computer, and in particular, according to one embodiment of the invention, a notebook computer. A wide view image display 122 is shown below bus 108, but in a preferred embodiment, as shown in FIG. 2, the wide view image display is formed as part of the camera body so that, preferably, formation of the wide view image as the camera is building the image can be observed by the user.

In particular, the digital camera includes an optical system 100 including a view finder 101 which may be an optical view finder. Alternatively, the view normally provided by the view finder 101 may be provided as an image on the display 120 that is displayed along with the wide view image 122 or as an alternative thereto. Of course, display 120 can also display other suitable information.

In more detail, with reference to FIG. 1, optical system 100 is used for focusing and framing the view of a scene or person for capturing the view on an image sensing device (CCD) 102 under control of the user who observes the scene or person through the optical system finder 101. The optical system includes a magnification adjusting mechanism for adjusting the degree of zoom. The operation data such as the zoom (magnification), etc. is transmitted to a CPU 112 that performs functions to be described later.

When a scene is shot and converted to electric signals through photo-electric conversion by image sensing device 102, an image compression encoder 104 receives the electric signals representing an image from the image sensing device 102, reduces the amount of data by using an image compression method such as that of the MPEG standard and stores them in an external storage device 110, which can either be part of the camera, for example a flash memory or a hard disk drive, or external to the camera, for example a memory storage device in a computer. The images are taken in at a frequency of about 30 times per second so that they are stored as consecutive dynamic images in the external storage device or processed to update a wide view image memory as they are received without being stored, as explained in greater detail hereinafter. Further, although each image or frame can be used at this rate, every other or every third (and so on) frames at this rate or a higher rate to be adopted according to new standards (MPEG 2) can be used in the processing of forming a wide view image according to the present invention so long as the detail of the resultant wide view image is satisfactorily maintained.

When a still image is to be captured, an image at a moment when the shutter is depressed may be stored. Sound can also be captured at this time with a microphone 126 and an A/D converter 128, and stored in the external storage device 110, being correlated to the dynamic images. Preferably, the external storage device 110 is a large-capacity storage device such as a hard disk or the like that provides non-volatile storage for digital data. The hard disk may be of the type which can be detached from the main body like a hard disk card of the PCMCIA type or it may be of the type in which only the storage medium is detached, like a magneto-optical disk.

The CPU 112 executes the control operation for starting/stopping the recording operation mentioned above and further executes the software program for realizing the functions which will be described in the present invention. A program, such as a camera control program 114-1, resides in a memory 114, in which are also stored values of variables and data (data 114-2, shown in greater detail in FIG. 6) that are necessary for the execution of the program. A video memory 116 stores an image 122 to be displayed on a display 120, as digital data. A D/A converter 118 of a type which is generally called a RAMDAC successively reads the data written on the video memory 116, adjusts to the speed of the scanning lines, and draws an image on the display 120. When the data in the video memory 116 is updated, therefore, the updated content is readily reflected on the display 120. The image being shot and input to the image compression encoder 104 can also be directly written in the video memory 116 by bypassing the image compression function.

The display 120 is a device for displaying an image, and may be, for example, a small CRT or a plasma display or may be a display device of the liquid crystal type. In addition to displaying the image stored in the video memory 116, additional images or alternative images can be displayed on display 120, such as the view from the optical system finder 101.

The image decompression decoder 106 decompresses the compressed dynamic image data stored in the external storage device 110 and outputs it to the video memory 116 as an image. An analog output 124 outputs the decompressed image after converting it into analog video signals of the type widely used for TV receivers of, e.g., the NTSC system. These outputs can be recorded by connecting the camera to a video apparatus such as that of a VHS type that is now widely used. The audio data that is recorded can be output through an audio D/A converter 132 and a loudspeaker 130 in synchronism with the decompression of the image. An input I/F 123 can be used for the control of switches such as a record button and a replay button, or it can accommodate a data input device such as a transparent touch panel attached to the surface of the display 120. The input data are transmitted to the CPU 112 and are suitably processed.

In general, for the digital wide camera of this embodiment, a sequence of images that are shot are connected together. First, the images that are shot are fed to the memory 114-2 according to a camera control program stored in the memory 114-1 during the shooting, and then are successively transferred to the video memory 116 to display a wide image 122 (connected images) on the display 120. After the shooting is finished, the wide image is stored as an image data structure 110-1 in the external storage device 110. With reference to FIG. 1, each image data structure includes an image header 110-1-1 that has data necessary for the decompression, such as the image compression system used, and the vertical and lateral sizes of the image. A flag 110-1-2 which represents whether the image is valid or invalid, is used at the time of simply editing the images. The image data size 110-1-3, which represents the number of bytes of the succeeding image data 110-1-4, is also stored. Therefore it is possible to calculate where the compressed image data are recorded in accordance with the kind of the image or the size of the wide image.

FIG. 2 illustrates the appearance of the digital wide camera according to a preferred embodiment of the invention. In this embodiment, a camera body 200 has the aforementioned lens unit (optical system) 100, finder unit for the optical system 101, flat panel display 120, and buttons 201 to 205. The image shot by the lens unit 100 can be confirmed through the finder unit 101 and can be displayed on the display 120, along with or alternatively to the wide view image obtained by connecting the images.

Of the buttons 201–205, an operation switch 201 is for zoom control, which is a rocker button switch in which the zoom operation is continuously performed when the switch is flipped toward one side or the other for increasing or decreasing the magnification of the viewed scene. The recording is accomplished upon depressing the record button 202; i.e., the recording starts when it is depressed once and ends when it is depressed again during recording (or only while it is being held down, etc.). In addition to recording the images shot during the recording period, when the user operates the camera to shoot a panoramic scene, a wide image is formed in real time by connecting the image sequence, and is displayed on the display 120. This makes it possible to quickly confirm the connection of the images and to prevent the failure in forming a wide image.

When the playback of the stored images is requested by operating a button, a list and the individual images are displayed on the screen 120. Further, for the camera of this embodiment, general-purpose buttons 203 and 204 are also provided for enabling various operations of the camera. Still further, a scroll button 205 is provided for selecting a wide image to be displayed and for scrolling through the stored wide images to be displayed on the display 120.

The recorded images can be output through an analog output 124 after being converted into analog video signals that are widely used for TV receivers. Furthermore, the recorded data can be transferred to a general computer through a computer interface 206. Thus, the digital wide camera of the present invention can be effective as a tool for collecting information.

Figure 3:
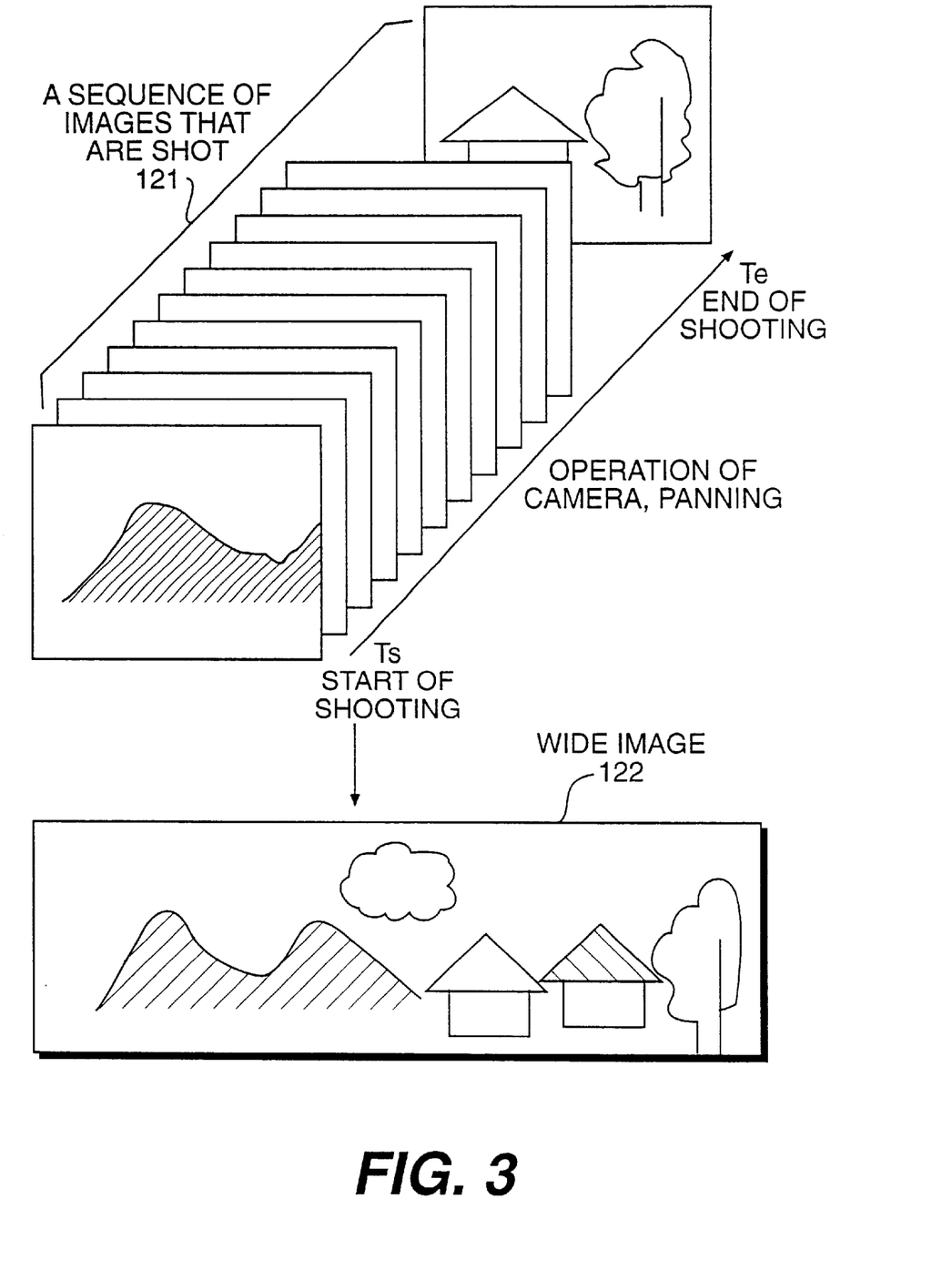
FIG. 3 is a diagram schematically illustrating the process of forming a wide view still image according to the present invention.

FIG. 3 is a diagram illustrating the steps for forming a wide view still image which will now be described, also with reference to FIG. 4. Once the record button 202 is depressed, a sequence of pictures or images (frames) are created beginning with a first image 121-1 of the sequence at time Ts and continuing until the record button 202 is depressed again at time Te until when it is depressed again. The picture sequence 121 that is shown in FIG. 3 is obtained when the pictures are taken while panning the camera from left to right in this example. That is, an image of "mountains" is shot at the start of the recording and an image of a "house" beside a tree is shot at the end of the recording. During this period, the images shift little by little due to the panning of the camera. When the panning of the camera stops, the image shifts no more and when the recording stops the sequence of images is ended. Under these circumstances, the object of the present invention is to obtain a wide view image 122 by connecting the sequence of images, according to the shifts in position of each of the images from the first image to the last in the sequence wherein the first image is written into an image buffer and each succeeding image is overwritten in the image buffer after a shift amount has been determined between each of the images due to the camera's movement.

Figure 4:
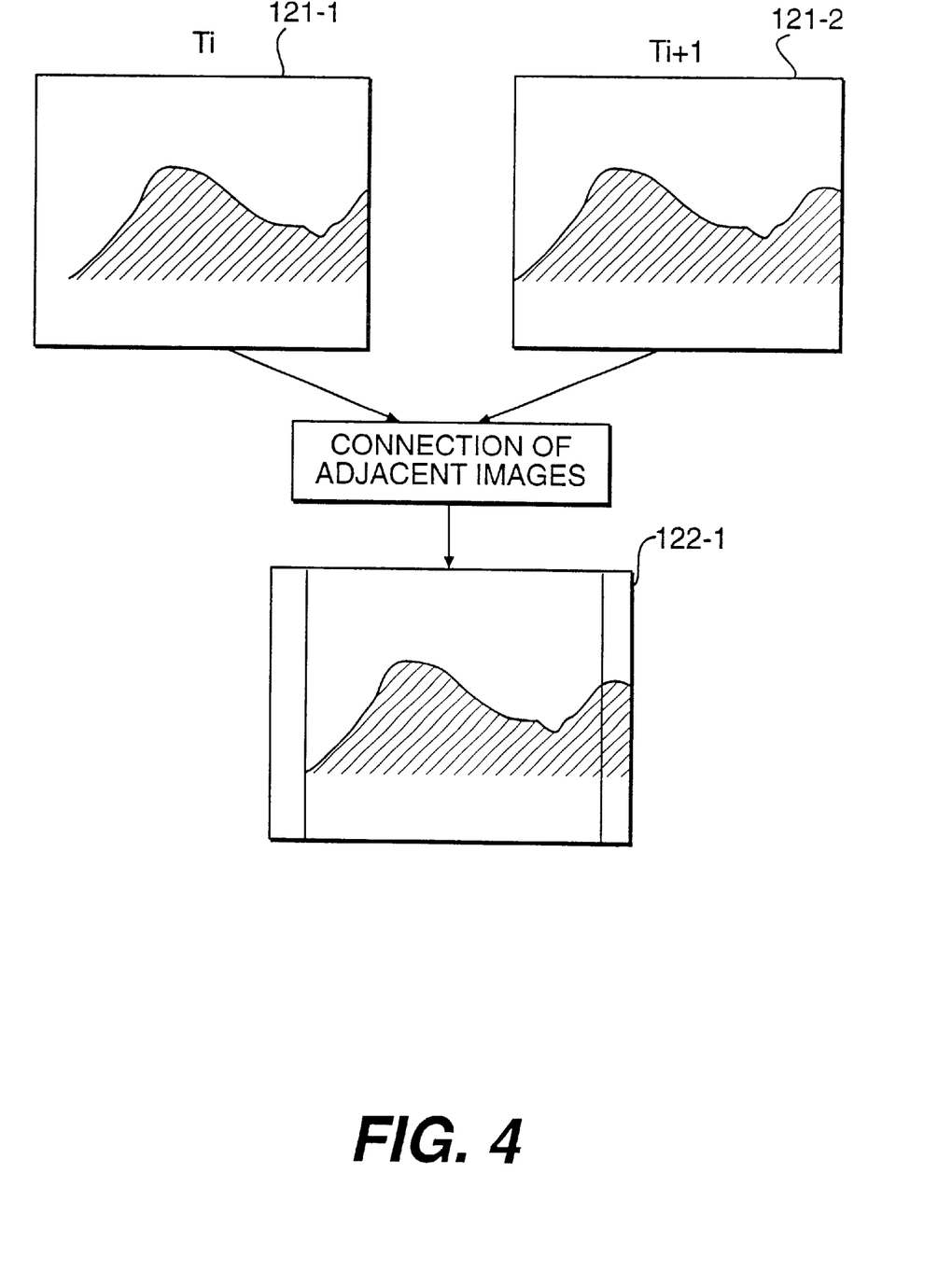
FIG. 4 is a diagram illustrating the joining of images according to the present invention.

For this purpose as shown in FIG. 4, based on the features of the images 121-1 (the first image in the sequence), 121-2 (the succeeding image) which are adjacent to one another in time as shown in FIG. 4, collation is performed to find the amounts of shift in position. Using the amounts of shift in position that are found, the latest image, in this example image 121-2 is overwritten on the wide view image 122-1 in which is already stored the first image of the sequence 121-1. This processing is executed for all of the images that are recorded to obtain a wide view image 122 as shown in FIG. 3, which is wider in field of view than the single images 121-1, 121-2, etc.

In the foregoing example, the camera has been shifted from left to right in a panning operation. However, the same holds true even when the camera is panned from left to right while also moving the camera up or down and further holds true when the camera is moved only up or down and still further to any combination of side to side and up and down movements of the camera, including tilting, for example, all generally referred to as panning.

Figure 5:
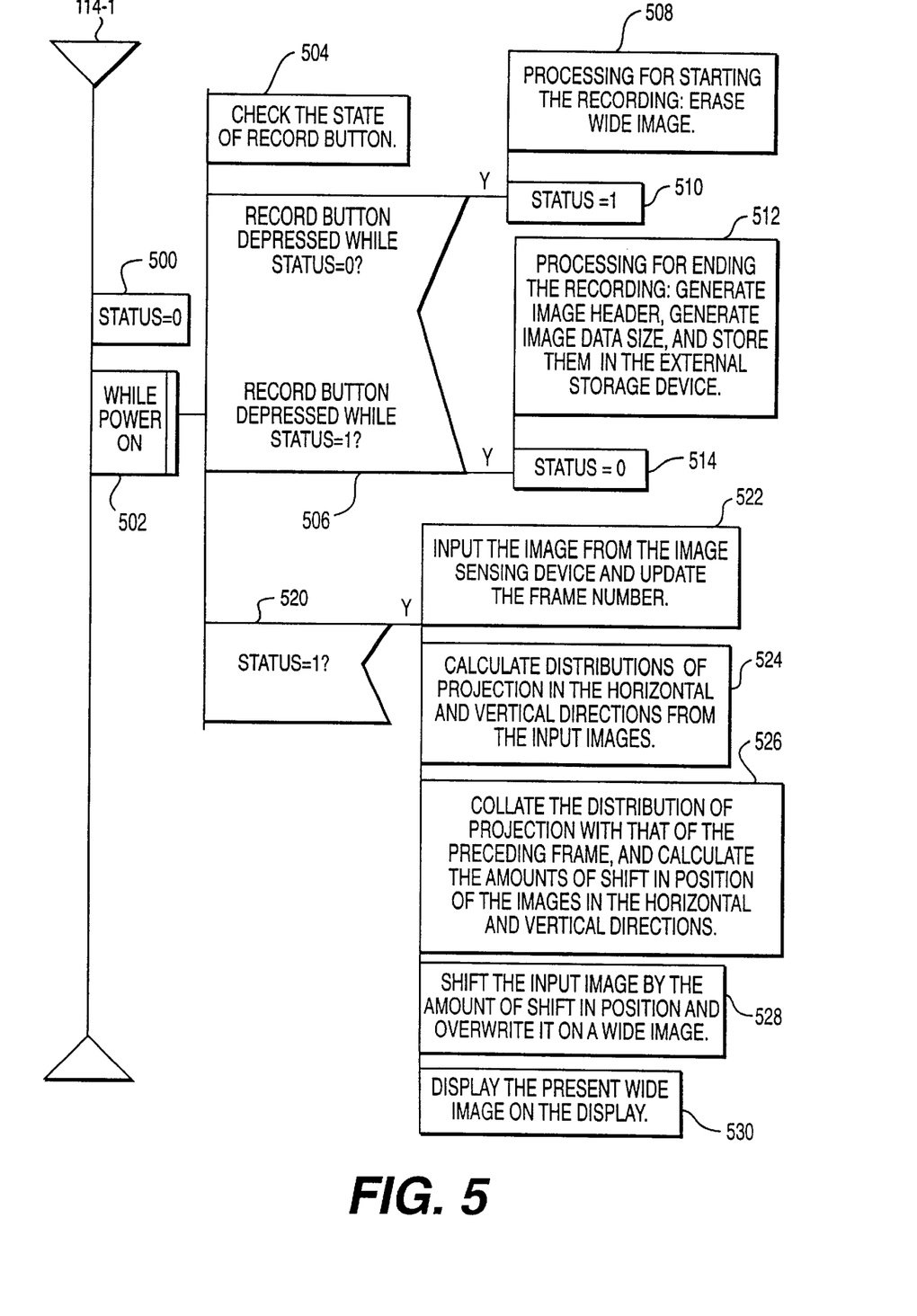
FIG. 5 is a flow chart of a camera control program according to the present invention.

FIG. 5 is a flow chart of a camera control program 114-1 according to an embodiment of the present invention, particularly showing the processing of forming a wide view image during recording. In addition to this processing, there are processings of editing, searching and retrieving of the stored images, and they are executed in a conventional manner according to the system of an existing digital camera.

Figure 6:
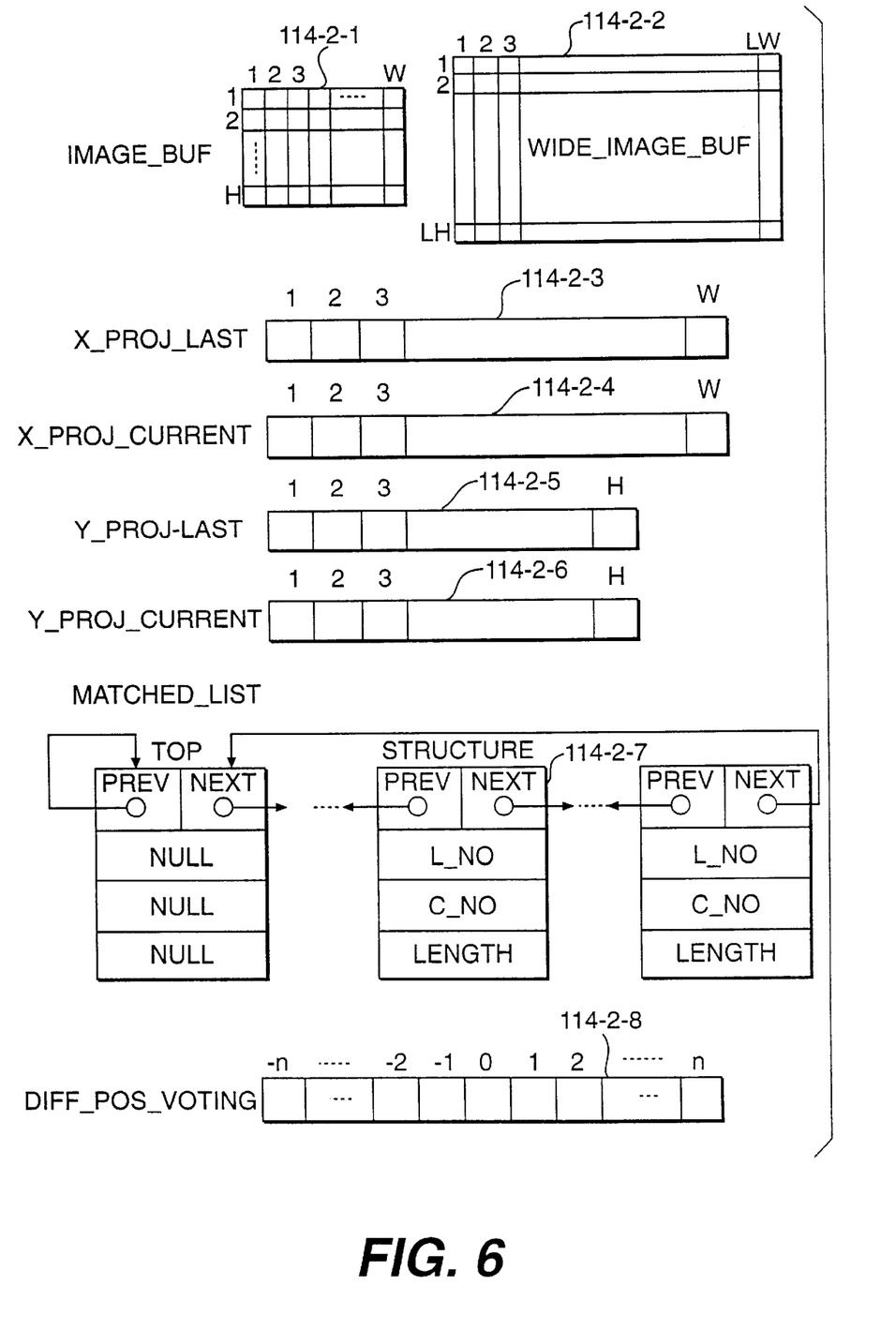
FIG. 6 is a diagram illustrating image buffers and data structures for forming a wide still image according to the present invention.

The camera control program 114-1 is executed by making reference to the data 114-2 shown in FIG. 6. In FIG. 5, step 500 is for initialization processing in which a variable "status" is reset to 0. While the power source of the camera is turned on (step 502), the following processing is executed for forming a wide view image. First, it is checked at step 504 whether the record button 202 is depressed or not.

When the record button is depressed with the status being reset to 0 (506), a record start processing 508 is executed.

Here, the preceding wide view image displayed on the display 120 of the camera is erased for the preparation of the display of a new wide view image. That is, WIDE_IMAGE_BUF of FIG. 6 is initialized. Next, the variable "status" is set to 1 at step 510 to effect the recording.

When the record button is depressed while the variable "status" is being set to 1 (506), on the other hand, a processing 512 is executed to end the recording. Here, the image header 110-1-1 and image data size 110-1-3 of the wide view images and the wide view images 122 formed during the recording are written in a predetermined place in the image data structure 110-1. Next, the variable "status" is reset to 0 at step 514 to end the recording.

At step 520, it is checked whether the status is 1 or not. When the status is 1, the following processing is executed. At step 522, the image is input through the image sensing device 102 and the image compression encoder 104, and is stored in the IMAGE_BUF 114-2-1 of the memory 114, whereby the frame number is incremented by 1. Next, at step 524, the projection distribution in the vertical and horizontal directions are calculated from the input image 114-2-1. The distribution of projection in the vertical direction is found by normalizing, by the height of the image, the result obtained by adding the values of intensity of the input images in the vertical direction. Meanwhile, the distribution of projection in the horizontal direction is found by normalizing, by the width of the image, the result obtained by adding the values of intensity of the input image in the horizontal direction. The above-mentioned distributions of projection are stored in X_PROJ_CURRENT 114-2-4 and in Y_PROJ_CURRENT 114-2-6 of FIG. 6, respectively. The distributions of projection are stored until the next frame is input. In such a case, the distributions are moved to X_PROJ_LAST 114-2-3 and to Y_PROJ_LAST 114-2-5, respectively. When yet a further frame is input, they are discarded.

As explained, the distribution of projection is found by normalizing. Normalizing in the vertical direction means to sum the intensity values of the pixels in each column of height H and divide that sum by the number of pixels for the column; and normalizing in the horizontal direction means to sum the intensity values of the pixels in each row W and divide the sum by the number of pixels in the row. This type of normalizing allows the invention to be applicable to different image sensors, since the array of pixels to be processed can be made variable, and therefore can vary between the typical number for a digital camera which is 320×240 up to a typical format of 640×480 without requiring fundamental differences in the processing techniques.

Since the intensity value of a pixel is a combination of the degrees of intensity for red, green and blue, it is at times convenient to use an approximation of the intensity value, by using only the intensity value of green, for example. The intensity value of green is approximately equal to the intensity of the pixel and can be used as the intensity value. However, it is preferred that the intensity value be calculated from the RGB values in the preferred embodiment.

Referring again to FIG. 5, at step 526, the distribution of projection of the preceding frame is collated with the distribution of projection of the current frame to calculate the amount of shift in position between the images in the horizontal direction and the amount of shift in position in the vertical direction. This processing will be described later in detail with reference to FIG. 7. Next, the input image 114-2-1 is shifted from the position of writing the image of the preceding frame by the amount of shift in position that was calculated at step 528, and is overwritten on the WIDE_IMAGE_BUF 114-2-2. At this moment, the image obtained by removing the peripheral image from the input image may be overwritten. Lastly, at step 530, the image of the WIDE_IMAGE_BUF 114-2-2 is transferred to the video memory 116, and an updated wide view image is displayed on the display 120.

At the time of transfer, the content in the WIDE_IMAGE_BUF 114-2-2 may be displayed after being scaled down to reduce the number of pixels according to the resolution of the display. Displays providing high resolution are generally expensive, so by scaling down the image to thereby reduce the number of pixels to be displayed in the image, an inexpensive display for the digital wide view camera can be provided. Here, it needs to be pointed out that that the wide view images are stored without being scaled down, so that they can be displayed or printed out through another display device with high definition when desired.

Each of the IMAGE_BUF and WIDE_IMAGE_BUF image buffers 114-2-1 and 114-2-2 is a single image buffer. As schematically shown, each of the blocks in these buffers represents a pixel having RGB data. Preferably, each of these image buffers is formed on a single chip. The capacity of the image buffer 114-2-1 is preferably sufficient to store the data of one frame or image to be processed. Preferably, the capacity of the image buffer 114-2-2 is much larger, since the succeeding images are overwritten on this image buffer.

Next, with reference to FIG. 7, an example of calculation of the amount of shift in position of the images for forming a wide view image of the embodiment of the present invention will be described. The processing for detecting the amount of shift in position of the images is executed in both the horizontal direction and the vertical direction. Here, however, since the techniques are the same, only the processing for detecting the shift in position in the horizontal direction will be described.

The technique of determining the shift in position between one image or frame and a succeeding image or frame relies upon forming separate one dimensional pixel intensity value projections for the entirety of each image in both the horizontal and vertical directions and collating the distributions of the projections for each of the images. Since the movement of the camera, with respect to the sequence of images that are processed, can be resolved into the horizontal and vertical directions, only the projections of pixel intensity in these directions are compared with each other. Thus, the amount of global shift in position for each frame is detected, which matches the movement of the camera in the panning operation with respect to the scene being shot.

Global pattern matching of sequential images, in which information from each of the pixels in the entire image is used at one time is achieved according to the matching technique of the present invention. As a result of the global pattern matching, the comparison of sequential images can be performed in a short amount of time. Thus, the amount of shifting that occurs between sequential images is determined rapidly and the subsequent writing of the shifted input image can be performed quickly enough to ensure that the wide view image is formed in real time. Further, the efficient processing speed ensures that additional image buffers are unnecessary since each time a new frame is shot, the processing begins again with a new input image. When a new input image is to be processed, the former current image projections, but preferably not the last input image itself, are saved in the buffers 114-2-3 and 114-2-5 as the "last" projections and the former "last projections are discarded. Then, the new "last" projections are processed for collation with the current projections of the input image. Thus, only one image need be stored at a time in the dynamic image buffer (IMAGE_BUF) 114-2-1, and there is a requirement for only one other image buffer, which is the image buffer for the wide view image 114-2-2.

Figure 7:
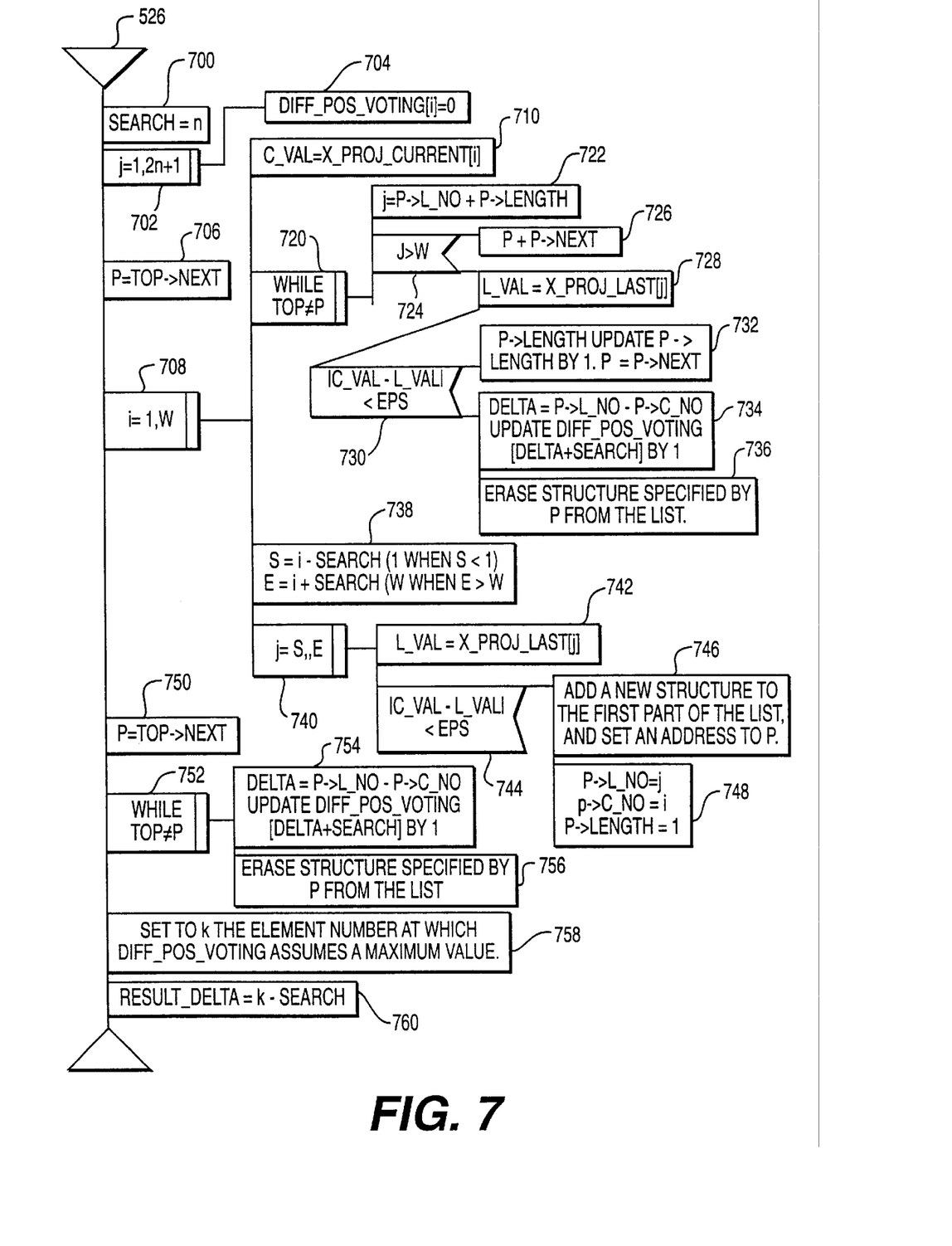
FIG. 7 is a flow chart of a processing for detecting the amount of shift in position between the images in a horizontal direction according to the present invention.

The global matching of the last and current images by collation of the distributions of their respective pixel intensity distributions begins with step 700, as shown in FIG. 7, in which a variable "search" is set to n. The variable n denotes a search range between the distributions of projection for detecting the amount of shift in position. In the case of the shift in position of the images by operating the camera, in general, the search range may be considered to be smaller than about ±16 pixels. By limiting the search range as described above, it is possible to greatly decrease the number of collations that are needed, as will be described later.

Figure 8A:
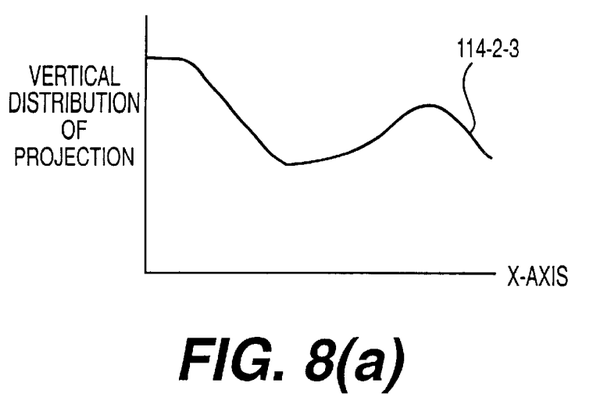
FIG. 8 is a diagram illustrating the contents of data referred to in the process for detecting the amount of shift in position according to the present invention.
Figure 8B:
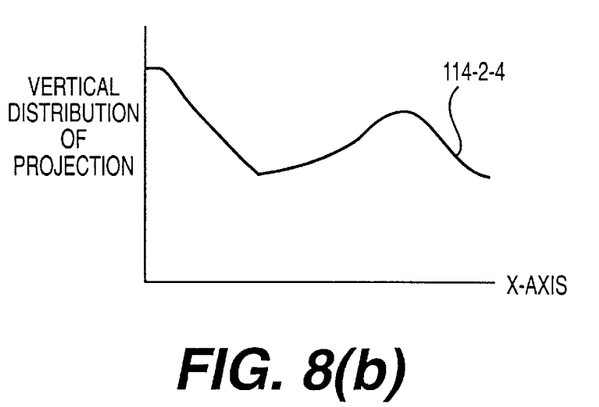

FIGS. 8(a) and 8(b) illustrate the distributions of projection of an image between consecutive frames X PROJ CURRENT 114-2-3 and X PROJ LAST 114-2-4, for example. The distributions of projection are roughly the same except at the end portions, and of course would be the same if the camera had not been moved at all between the time of shooting the two frames.

Next, in the collation processing, as shown in FIG. 7, a voting array DIFF_POS_VOTING 114-2-8 for detecting a shift of position is reset to 0 (steps 702 and 704). At step 706, a pointer P is initialized to make reference to a MATCHED_LIST.

With reference to FIG. 6, the matched list is a list of partial pattern matching points having the data of where the projections match each other. For example, the data includes a last number L, a current number C, and a length, which is the length of the matching between the projections of the current frame and the last frame.

After a series of processings for initialization, first, a processing for collating the distributions of projection is executed at steps 708 to 748. The following processing is executed for the lateral width w of the image (step 708). At step 710, the i-th element of X_PROJ_CURRENT is set to a variable C_VAL. It is checked whether or not the collation should be continued among the variable C_VAL, the X_PROJ LAST and the structure 114-2-7 set forth in the MATCHED LIST.

The structure 114-2-7 of the MATCHED LIST is constituted by pointers to the preceding and succeeding structures, the element number L_NO for which the collation of distributions of projection of the preceding frame which is being collated is started, the element number C_NO for which the collation of the current frame is started, and a collation continuation length LENGTH. Owing to this constitution, partial coincident portions between the distributions of projection are all described. Furthermore, the difference between the element numbers represents the amount of shift in position between the distributions of projection, and by listing all of the partial coincident portions which are quantities reflecting the shifts in position among the images, correct and reliable amounts of shift in position can be calculated by a statistical processing described later.

First, while a candidate list is existing (step 720), the processings of steps 722 to 736 are executed repetitively. At step 722, the element number j of the distribution of projection to be collated next is found. When the element number j exceeds the lateral width W of the image (724), only the address of the next candidate list is set at step 726. When the element number j is smaller than the lateral width W (724), on the other hand, the j-th element of X_PROJ_LAST is set to a variable L_VAL at step 728. It is checked at step 730 whether the absolute value of difference between C_VAL and L_VAL is smaller than a predetermined value EPS or not. When this absolute value is smaller than the predetermined value EPS, the LENGTH of the corresponding structure is counted up by 1 at step 732 and, then, the address of the next candidate list is set to the pointer P. The predetermined value EPS may be about 8 with respect to intensity values of 256 levels. When the absolute value is greater than the predetermined value EPS, on the other hand, the difference between L_NO and C_NO is found at step 734 and is set to a variable DELTA. This represents the amount of shift in position of the set collated, and gives a vote for the element of the corresponding DIFF_POS_VOTING. Next, the collation of this set is regarded as finished, and the corresponding structure is erased from the list at step 736. Through the above-mentioned processings, the collation is continued and a processing for erasing is effected.

Next, a processing for registration to a MATCHED list will be described. At step 738, a search range for X_PROJ_LAST is calculated and is set to a search start point S and to a search end point E (step 740). The content of X_PROJ_LAST is compared with the content of C-VAL of from the point S to the point E (step 742). When the absolute value of the difference is smaller than EPS (744), it is so considered that the collation has ended well, and a new structure is generated at step 746 and added to the first part of the list, and the element number and the length thereof are set at step 748. The length is first 1.

Figure 8C:
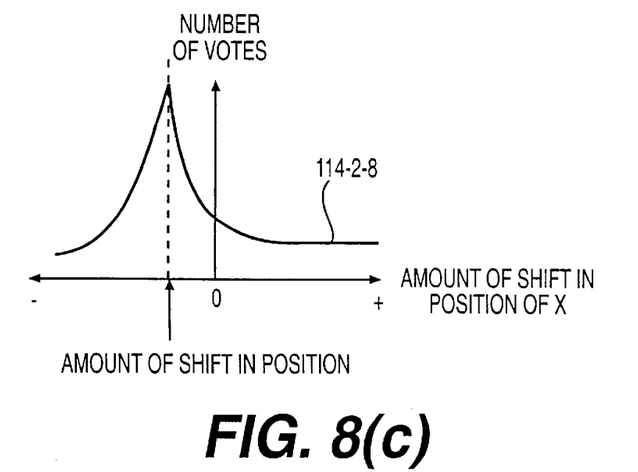

The voting of shift in position is almost finished through the above-mentioned processings of the steps 708 to 748. Here, however, the set that is continued to be collated up to the last is not erased and still remains in the list. Therefore, in the processings of steps 750 to 756, a vote is given to the element DIFF_POS_VOTING as described already depending upon the amount of shift in position of the remaining structure. After the end of this processing, the content of the array of DIFF_POS_VOTING exhibits a peak of voting at the true amount of shift in position as shown in FIG. 8(c). At step 758, therefore, the element number at which the DIFF_POS_VOTING assumes a maximum value is found and set to a variable K. Lastly, in step 760, the variable "search" is subtracted from the variable k to calculate the amount of shift in position between the images. When the maximum value is smaller than a predetermined value, it may be considered that the collation has not ended well, and the amount of shift in position may be set to 0. This prevents incorrect connection of images.

According to the present invention as described above, the amount of shift in position is voted for the array making it possible to find the amount of shift in position from the result of taking all of the combinations of collation into consideration and, hence, to connect more correctly and reliably the images. The feature of the images used for the collation is the distribution of projection of intensity, making it possible to accomplish the calculation at high speeds and to detect the amount of global shift in position of the image as a result of operating the camera without the processing being affected by the motion of small objects in the image. Moreover, the method of collation of the invention makes it possible to display, in real time, the images that are merged owing to the decreased amount of calculation.

Figure 9:
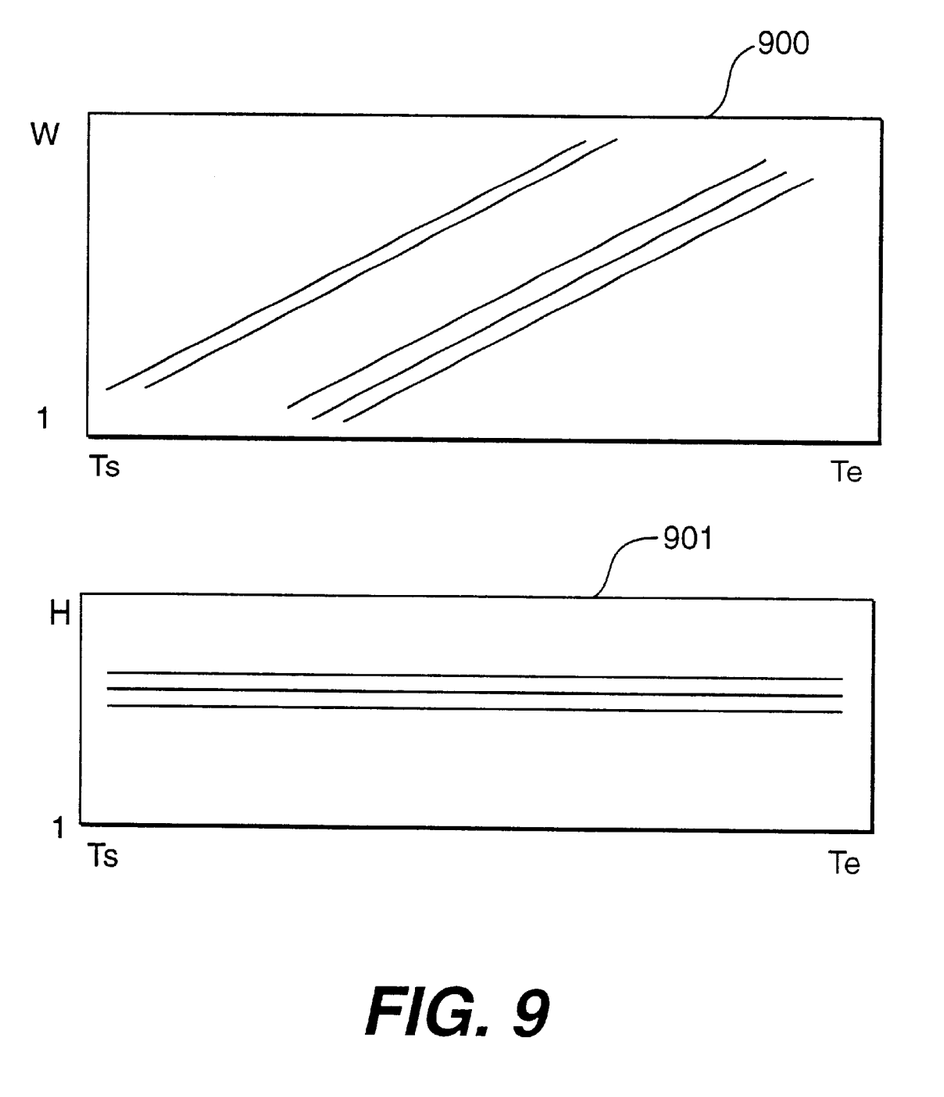
FIG. 9 is a diagram of displaying a time-space image of a distribution of projection according to the present invention.

FIG. 9 illustrates a user interface according to an embodiment of the invention. A vertical projection distribution 900 and a horizontal projection distribution 901 are shown. The horizontal axis represents the shooting time, from the start of shooting Ts to the end of shooting Te, and the vertical axis represents the projection position. In the example, one vertical line is used for each frame (not shown). To obtain the vertical lines that are used for each frame, the value of the vertical distribution of projection (or horizontal projection) is converted into a density value or contrast line (the vertical line) and then lines joining matching values of density in the vertically arranged contrast lines are displayed, as shown in FIG. 9.

Specifically, FIG. 9 illustrates a distribution of projection when the camera is panned from the right to the left, which accounts for the positive slope of the lines 900. If the camera is panned from the left to the right, then the equal density value lines that pass through the vertically arranged contrast lines would have a negative value. Since the camera, in the example of FIG. 9, is not substantially moved up or down, the adjacent vertically arranged contrast lines obtained from the horizontal distribution of projection data are substantially similar, i.e. not shifted with respect to one another in the up or down direction, so the lines 901 are horizontal as shown. Upon arranging such a representation together with a wide image on the display 120, the user can easily comprehend the operation of the camera with the passage of time.

Figure 10:
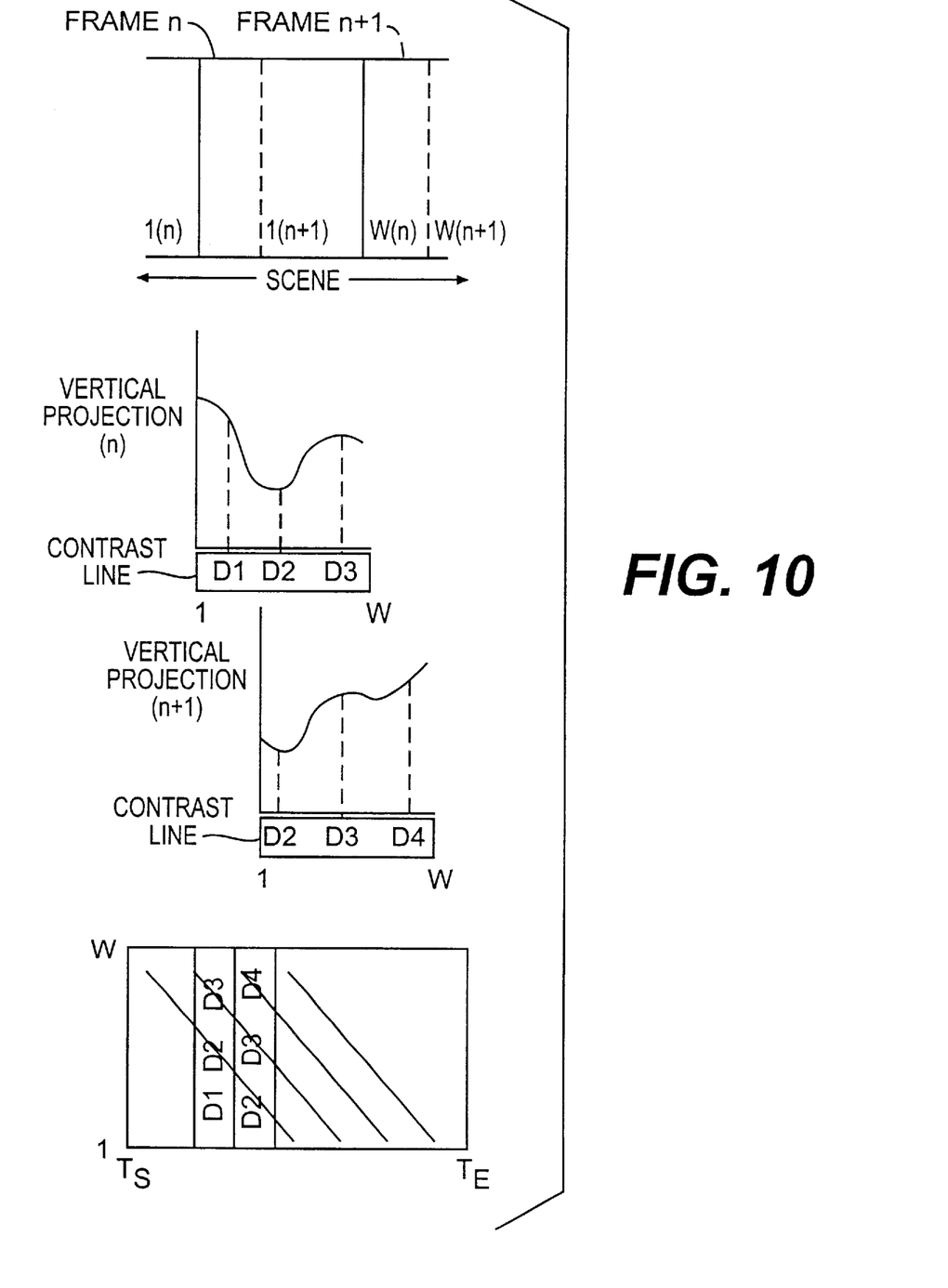
FIG. 10 is a diagram of displaying a time-space image of a distribution of projection according to the present invention.

FIG. 10 shows another example of the embodiment shown in FIG. 9. The example is based on left to right panning of the camera during recording from time Ts to Te. Since the horizontal projection would be the same as that for the example of FIG. 9, i.e. horizontal lines 901, only the result of processing of the vertical distribution of projection data is shown in this example.

First, a scene is shot and two frames "n" and "n+1" are normalized as explained previously to obtain the vertical distribution of projection lines, as shown. Next, the contrast line data is derived from the vertical projection line data by assigning each point of the vertical projection line a density value as a representation of the amount of the distribution of projection. The resulting contrast line is shown in the figure in a very simplified way for the purpose of easily illustrating the example, it being understood that many sampling points (represented by D1–D4, herein) would be taken to obtain a great number of density values for the contrast line.

The contrast lines represent the densities of the vertical projection at each point along the x-axis. For example, a large value of the amount of the distribution of projection is represented as a darker or denser value along the contrast line, whereas a small value of the amount of the distribution of projection is represented as a lighter or less dense value along the contrast line. Thus, in the present example, density value D2 represents a lower density value than density values D1, D3 and D4. When these contrast lines, one for each frame, are arranged adjacent to one another vertically, as shown in the bottom part of the figure, a pattern emerges between the adjacent contrast lines, in which the shift amount between adjacent frames caused by the panning of the camera is evidenced by a vertical shift in the respective density distributions. This pattern can be shown schematically by representative lines, as in FIGS. 9(*a*) and 9(*b*), by drawing lines through the plurality of matching or common density value points.

In the example of FIG. 10, equal density value points D2 and D3 in each of the contrast lines of the n and the n+1 frames are used to show the joining of equal density point lines 900. The angle of such lines indicates the degree of shift between adjacent frames, as well as the aforementioned direction of panning movement, since a steep slope shows a large shift or relatively fast camera movement during recording and a shallower slope shows a lesser amount of shift between frames indicating that the camera is moving relatively slowly. As a result, the lines 900 and 901 are horizontal when the camera is not moved during recording, and are nearly vertical when the camera is moved so fast or the scenery changes so much that there is no matching pattern of density points between adjacent frames. In the latter case, this would indicate an expected bad result since no matching scenery from which the wide view image could be formed would be indicated. Further, when the camera is moved up or down, instead of side to side, the lines 901 are slanted whereas the lines 900 are substantially horizontal. Thus, the information displayed according to this embodiment as shown in FIGS. 9 and 10 provides a useful interface for the user when operating the camera.

According to the present invention, it is possible to automatically paste frames of image and to form a wide view and highly fine still image from the images over a wide angle of view obtained by the user by operating the camera. Besides, the images are pasted in real time, and the conditions for forming a wide view still image can be confirmed on the display from time to time, making it possible to prevent a failure of shooting a picture in advance. Moreover, the images can be transferred to a computer and can be printed out by using a printer to obtain high-definition images.

We claim:

1. A digital camera, comprising:
   an operation input means for starting and ending recording of a scene;
   an image sensing device for capturing a plurality of images of a scene as a dynamic image;
   a shift value determining means for determining amounts of shift in position between consecutive ones of the plurality of images due to movement of the camera during the recording;
   and a wide view image display means for displaying a wide view image obtained by connecting the consecutive images by overwriting a current one of said consecutive images with respect to a last one of said consecutive images by the amount of shift in position determined by said shift value determining means, wherein:
   said shift determining means uses global pattern matching between the consecutive images taking the projections of the intensity values of the pixels in the horizontal and vertical directions, and
   said wide view image display means sequentially displays wide view image that is formed from the start to the end of the recording.

2. A digital camera according to claim 1, further comprising:
   image storage means for storing said wide view image and said dynamic image, wherein said plurality of images of said dynamic image are read out from said image storage means, and said wide view image is displayed on said wide view image display means as said plurality of images are read out.

3. A digital camera according to claim 1, wherein said shift value determining means includes a pixel intensity value projection distribution determining and storage means for storing distributions of projections in pixel intensity in the horizontal and vertical directions of the current and last images, and a projection distribution collating means for detecting, by collation, the amounts of shift in position among the projection distributions in the horizontal and vertical same directions for the current and last images, wherein the amounts of shift in position of the projection distributions in the horizontal and vertical directions are used as the amounts of shift in position among the consecutive images due to the movement of the camera.

4. A digital camera according to claim 3, wherein said pixel intensity value projection distribution determining and storing means determines said projection distributions by normalizing the results of integration of the intensity values of pixels constituting an image in the horizontal direction and the vertical direction, respectively, with respect to the number of pixels in the integration.

5. A digital camera according to claim 3, wherein the projection distribution in said projection distribution storage means is displayed on said wide image display means as a two-dimensional time-space image, one dimension being such that the individual values are used as densities of image, and another dimension being the time axis of the recording section.

6. A digital camera according to claim 5, wherein said time-space images are successively displayed on said wide image display means from the start to the end of the recording.

7. A digital camera according to claim 3, wherein said wide view image display means scales down said wide view image for displaying said wide view image.

8. A digital camera according to claim 3, wherein said projection distribution collating means includes a partial coincidence detecting means for detecting a section in which the two projection distributions to be collated are partially coincident, a voting means for adding the corresponding elements of a voting array based on the amount of relative shift in position in the partially coincident section, and a maximum value detecting means for detecting a maximum value of the content of the voting array formed by said voting means, wherein the amount of shift in position is determined from the element number in the voting array which is the maximum value.

9. A digital camera according to claim 8, wherein said partial coincidence detecting means detects coincident sections for all partial sections in the projection distributions being collated.

10. A digital camera according to claim 8, wherein in said partial coincidence detecting means, a criterion for judging coincidence is set so that the absolute value of the difference between the two projection distributions to be collated is smaller than a predetermined value.

11. A digital camera according to claim 8, wherein said partial coincidence detecting means includes a matched list means for searching for elements having values that are in agreement between the two projection distributions being collated and for initializing the mutual element numbers and the lengths of coincident sections of the structures to 1, and a positional shift detecting means for referring to the structures that are listed, judging whether the elements of the projection distributions are coincident, updating the length of the coincident section of the corresponding structures when there is coincidence, finding the amount of relative shift in position from the difference in the mutual element numbers between the structures when there is not coincidence, and erasing the structures.

12. A digital camera according to claim 11, wherein said matched list means performs the list in the range such that the absolute value of the difference in the element numbers between the projection distributions does not exceed a predetermined range.

13. A digital camera according to claim 8, wherein when the maximum value is smaller than a predetermined value, it is so regarded that the detection of the amount of shift in position has failed, and an amount of the shift in position is set to 0.

14. A program resides in a memory which executes;

a step of determining amounts of shift in position between consecutive ones of the plurality of images captured by an image sensing device by using global pattern matching between the consecutive images by taking the projections of the intensity values of the pixels in the horizontal and vertical directions;

a step of obtaining a wide view image by connecting the consecutive images by the amount of shift in position determined in said shift determining step;

a step of displaying a wide view image on a display.

* * * * *